March 31, 1953 F. E. CURTIS 2,633,079
RETAINING MEANS FOR PRINTING PLATES
Filed Dec. 16, 1950 2 SHEETS—SHEET 1
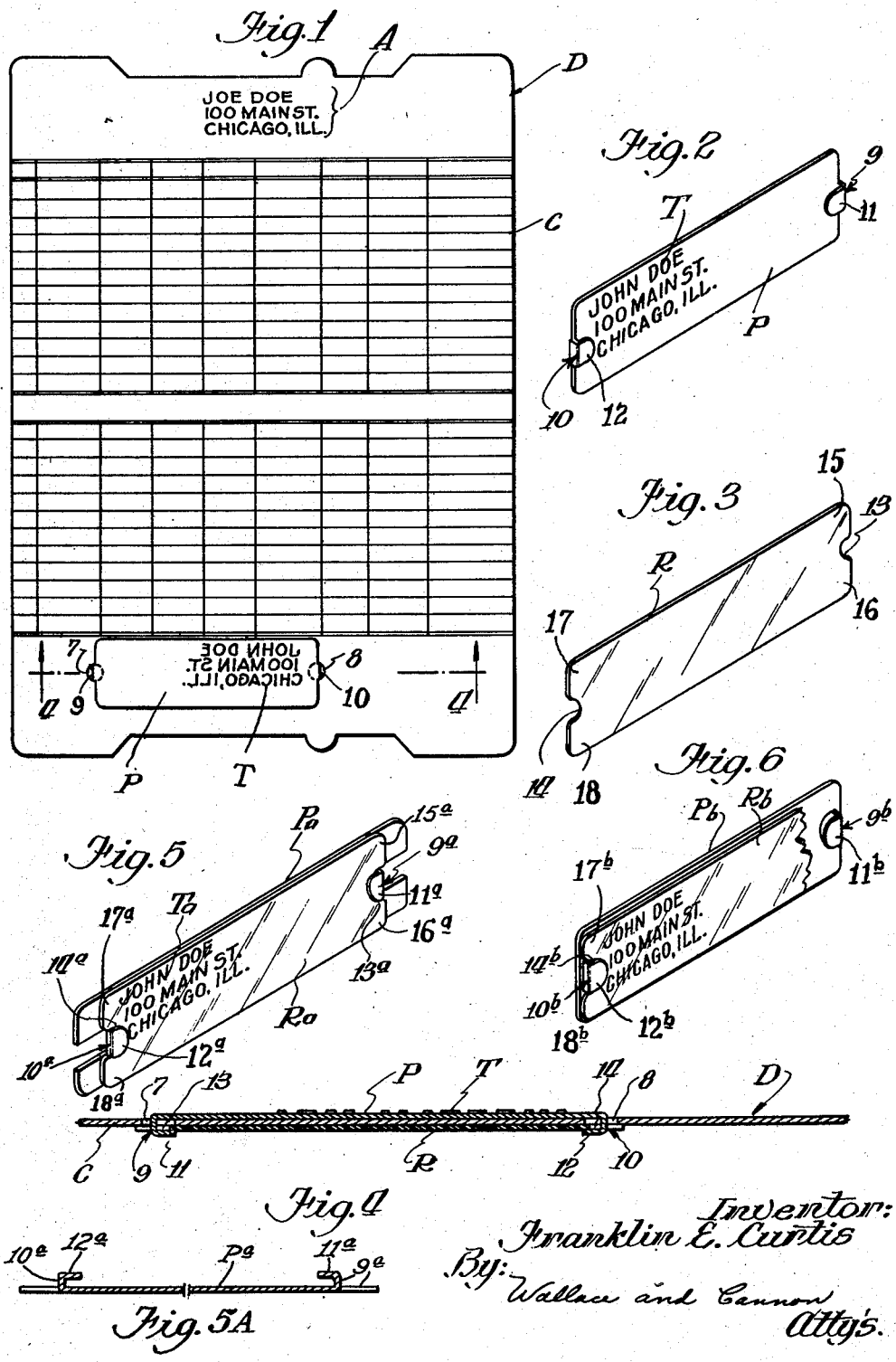
Inventor:
Franklin E. Curtis
By: Wallace and Cannon
Atty's.

March 31, 1953 F. E. CURTIS 2,633,079
RETAINING MEANS FOR PRINTING PLATES
Filed Dec. 16, 1950 2 SHEETS—SHEET 2

INVENTOR:
FRANKLIN E. CURTIS

BY:
*Wallace and Cannon*
ATTORNEYS:

Patented Mar. 31, 1953

2,633,079

UNITED STATES PATENT OFFICE 2,633,079

RETAINING MEANS FOR PRINTING PLATES

Franklin E. Curtis, Willoughby, Ohio, assignor to Addressograph-Multigraph Corporation, Wilmington, Del., a corporation of Delaware Application December 16, 1950, Serial No. 201,172

14 Claims. (Cl. 101—369)

This application is a continuation-in-part of my application, Serial No. 25,880, filed May 8, 1948, and is also a continuation-in-part of my application, Serial No. 778,533, filed October 8, 1947, each of said applications being abandoned.

This invention relates to printing devices of the kind from which data, such as a name and address, may be printed to insure accuracy in preparing business instruments and the like in connection with business transactions involving data borne by the printing device.

In certain business institutions, such as, for example, large department stores and the like, it is common practice to maintain individual record sheets, record cards, or the like, for each customer, such cards carrying a record of charges made against the customer, and of payments made by the customer. This is especially true in business institutions in which purchases are made on the installment plan and in institutions, such as, for example, loan companies wherein payments of principal and interest or the like are made periodically by the customers.

In such institutions when an account is due and payable or when a customer, borrower or the like, has failed to make an installment payment when due, the usual practice is that the institution to whom a payment is due sends a notice to the customer or the like. In following this procedure, daily checks are usually made of the records to determine if any of the customers are newly in default on their payments and, if it is found that some of the customers are so in default, the cards of those customers are removed from the file and the appropriate notices are prepared and forwarded. In preparing such notices for forwarding, the procedure usually has been to manually copy the name and address of the customer, as it appears on the record card, onto an appropriate place on the notices and sometimes also onto an envelope in which the notice is to be sent. Such procedure, of course, gives rise to the possibility of mistake, copying errors being relatively easy to make in manually transcribing the name and address of the customer from the record card onto the notice and envelope. It is, therefore, a primary object of my invention to eliminate such copying errors in the transcribing of a name and address onto a notice or the like, and it is an object ancillary to the foregoing to provide a novel printing device which is well adapted to be used as a record card of the aforementioned type and from which the name and address of a customer may be directly printed onto letters, notices, and the like, which are to be sent to the particular customer for whom the card had been prepared.

It is a further object of my invention to provide a printing device embodying an identification card, or the like, and a printing part which are associated together in a novel and expeditious manner, and an ancillary object is to enable an identification card, or the like, and a printing member to be quickly and easily attached to, and detached from, each other.

Ininstances where a customer makes a considerable number of purchases from an institution using the type of record card or record sheet to which my invention primarily relates, and in institutions wherein the payments made on a loan are relatively numerous, it is possible that before the entire transaction has been completed several of such cards or sheets, bearing appropriate entries, may have been used, and it is another object of my invention to enable the printing part of my novel printing device to be quickly and easily transferred from an old to a new card under such or similar circumstances.

A further object is to so afford a printing device embodying an identification number, printing member and a retaining member that are so arranged that retaining clips afforded at opposite ends of the relatively rigid printing member will be extended through openings in the identification member to cooperate with a flexible retaining member so that when the printing member is arranged on one side of the identification member and the retaining member is arranged on the other side thereof, the three elements will be effectively but detachably secured together.

A yet further object is to dispose the retaining clips provided at opposite ends of the printing member in positions disposed substantially medially in the extent of said opposite ends and to correspondingly locate recesses in opposite ends of the retaining member so that marginal portions of the retaining member may extend beyond the retaining clips provided on the printing member whereby the portions at the bottoms of the recesses in the retaining member will be disposed in cooperative relation with the aforesaid retaining clips.

A still further object is to construct a printing device embodying the aforementioned identification member, printing member and retaining member, wherein the printing member has flanges formed on the central portion of opposite edge portions thereof and the retaining member has tongues formed in the central portion of corresponding opposite edge portions thereof, and wherein the flanges on the printing member and the tongues on the retaining member are adapted to operatively engage each other and, when so engaged, are effective to secure the identification member, the printing member and the retaining member together in a novel and expeditious manner.

Yet another object of my invention is to construct a printing device of the aforesaid character in such a manner that the printing member may be readily attached to and detached from the identification member by springing the retaining member into and out of engagement with the printing member, so that when it is desired to change identification members this may be quickly and easily accomplished while using the same printing member and retaining member.

Other and further objects of the present invention will be apparent from the following description and claims and are illustrated in the accompanying drawings which, by way of illustration, show preferred embodiments of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

In the drawings:

Fig. 1 is a front elevational view of a printing device embodying one form of my invention;

Fig. 2 is a perspective view of a printing member that may be employed in the printing device shown in Fig. 1;

Fig. 3 is a perspective view of a retaining member of the kind employed in the form of my printing device shown in Fig. 1;

Fig. 4 is a sectional detail view taken substantially on the line 4—4 in Fig. 1;

Fig. 5 is a perspective view of another form of printing and retaining members that may be employed in my novel printing device showing these two elements one assembled on the other;

Fig. 5A is a longitudinal sectional view taken substantially midway between the longer edges of the printing plate shown in Fig. 5.

Fig. 6 is a view similar to Fig. 5 showing yet another modified arrangement of the printing and retaining members;

Figure 7:
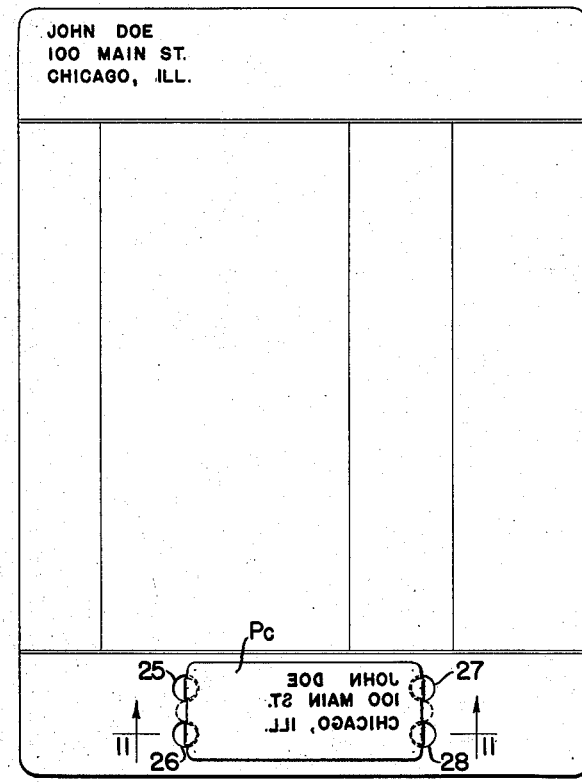
Fig. 7 is a view similar to Fig. 1 but showing a modified form of my invention.

A printing device D is shown in Figs. 1 to 4, inclusive, of the accompanying drawings to illustrate a preferred embodiment of my invention and this comprises an identification member as C, a printing member as P and a retaining member as R, all three of which are fastened together in a novel manner to comprise the printing device as D.

In the form of my invention shown in Fig. 1, the identification member C comprises an identification card or record sheet of the type commonly used and maintained in files of companies wherein it is desired to maintain a running account of charges made against, and payments made by, individual customers, a card or record sheet of this kind being maintained in the files for each such customer, and suitable entries being made thereon at the time of a transaction with that customer. The term "identification card" is used herein in a generic sense and includes sheets, cards and the like of any one of several types commonly used by business institutions to carry the name and address and other pertinent data regarding an individual.

The identification card C shown in Fig. 1 has the name and address A of the particular customer to whom that card pertains printed along the upper marginal edge thereof, and a printing plate P and a retaining member R are mounted on the lower end portion of the card. The printing plate P in the illustrated form of my invention is secured on the card C on the same face thereof as that on which the aforesaid name and address is printed. This, however, is not essential for if desired the plate P could be retained on the opposite side of the card C.

The printing plate P is formed from sheet material as, for example, sheet metal, and is of such nature as to be embossable, which is to say, type characters as T are embossed on the plate as P to appear in relief on one face of the plate and in intaglio on the other, the relief faces of such type characters affording the printing surfaces. Hence the embossable plate P is made of a ductile material but one which, nevertheless, possesses sufficient rigidity to avoid the type characters being smashed or otherwise damaged when subjected to pressure incidental to the making of impressions therefrom, such impressions usually being made by having an inked ribbon interposed between faces of the type characters and the sheet on which the impression is to be made and thereafter forcing the sheet and the ribbon toward the type characters. Desirably the address A printed on the card C, as aforesaid, is printed thereon from the type characters T embossed on the plate P.

The card C has openings 7 and 8 formed therein along the lower marginal portion thereof and these openings are spaced one from the other in order that retaining clips as 9 and 10 on the plate P may be passed therethrough when the intaglio face of the embossed plate P is rested against the aforesaid face of the card C.

In the form of my invention shown in Figs. 1 to 4, inclusive, the printing plate P is substantially rectangular in outline and the retaining clips 9 and 10 are formed on the shorter ends of the rectangular plate substantially medially between the longer edges thereof. These retaining clips are afforded by tongues that extend outwardly from the shorter edges of the plate when it is blanked from a sheet of embossable material of the aforesaid nature. The tongues so afforded are thereafter first bent into right angular relationship with the main body of the plate P so as to extend beyond what will be the intaglio face of the plate when type characters are embossed thereon. The free ends of the retaining clips are then bent into normal relationship with the parts thereof extended in right angular relationship with the main body of the plate P so as to thereby afford retaining elements 11 and 12 that extend over, but in spaced relation with, what will be the intaglio face of the plate P when type characters are embossed thereon. Desirably the inwardly disposed faces of the retaining elements 11 and 12 are spaced from the adjacent face of the plate P in an amount such that the thickness of a card as C, and of the retaining member R to be explained presently, may be neatly accommodated between the adjacent faces of the plate P and the retaining elements 11 and 12.

The retaining member R is desirably formed of transparent flexible sheet material such as polyvinyl acetate chloride or the like and while flexible, this member should have sufficient innate rigidity to be effective to serve as a securing element when associated with the retaining clips 9 and 10. The retaining element R shown in Figs. 1 to 4, inclusive, is substantially rectangular in outline and is desirably substantially complementary to the body of the plate P. Recesses 13 and 14 are formed in the shorter edges of the retaining member R midway between the longer edges thereof to accommodate the aforesaid right angularly extending portions of the retaining clips 11 and 12.

In order to assemble a printing plate as P on a card as C, retaining clips 9 and 10 are passed through openings as 7 and 8 in the card C, such openings being spaced one from the other in an amount corresponding to the spacing of the retaining clips 9 and 10 one from the other so as to enable retaining clips to be freely and respectively passed through the openings. Once the retaining clips 9 and 10 have been passed through openings as 7 and 8, the retaining member R is disposed on the face of the card as C opposite that against which the printing plate P is rested and the retaining member R is flexed so as to enable the marginal portions thereof about the inner ends of the recesses 13 and 14 to be respectively disposed beneath the retaining elements 11 and 12. Thereupon ears 15 and 16 on opposite sides of the recess 13 and ears 17 and 18 on opposite sides of the recess 14 respectively extend past the aforesaid right angularly extending or upright portions of the clips 9 and 10 and these ears and the marginal portions of the retaining member R disposed beneath the retaining elements 11 and 12 are effective to prevent relative movement between the retaining member R and the card C. The disposition of the clips 9 and 10 in the openings 7 and 8, which are sized to neatly accommodate the clips, prevents relative movement between the card C and the printing member P. Hence, when a plate as P and retaining member R are interconnected as above described, the three elements of my novel printing device are secured against undesirable movement thereamong.

Type characters as T will be embossed on a printing plate as P prior to the time this plate is secured in the aforesaid manner to the card C. Therefore, when it is desired to make an impression from such type characters, the printing member on the card C may be disposed in a suitable printing machine to have such an impression made therefrom, the mounting of the printing member P on the card C facilitating such use of the printing member.

Whenever it is necessary or desirable to remove a printing plate as P from a card as C, the flexible retaining member R is flexed so as to withdraw one or the other or both of the end marginal portions thereof disposed beneath the retaining elements 11 and 12 from beneath such elements and thereupon the retaining member may be detached from the card and the printing plate P is also released from the card.

As shown in the modified forms of my invention illustrated in Figs. 5 and 6 a printing plate as P and a retaining member as R may be assembled one on the other apart from being assembled on the card C. This enables these elements to be shipped as an assembly by the producer thereof, if so desired, and enables these elements to be secured together when removed from a card as C for storage purposes or the like.

In Fig. 5 I have shown a modified form of my invention and in the arrangement there shown those elements which correspond to elements described hereinabove are designated by the same reference character as that employed hereinabove to designate such elements except that the suffix "a" is added to such reference characters where these appear in Fig. 5.

The substantially rectangular printing plate Pa illustrated in Figs. 5 and 5A has retaining elements 9a and 10a formed thereon and these retaining elements correspond to retaining elements described hereinabove, except that instead of providing tongues which extend beyond the edges of the blank, as in the instance of the retaining clips 9 and 10, the retaining clips 9a and 10a are afforded by material struck from the main body of the printing plate Pa. Thus along the shorter edges of the plate Pa the material in the main body thereof is slit at points spaced one from the other in the amount of the desired width of the retaining clips 9a and 10a and the lines of severance are extended inwardly from the adjacent edge of the plate Pa in an amount sufficient to afford material that may be bent into retaining clips embodying the form of the clips 9 and 10 described hereinabove.

The retaining member Ra corresponds to the retaining member R except that the recesses 13a and 14a formed therein extend inwardly from the shorter edges thereof in an amount greater than the extent of the recesses 13 and 14 in the retaining member R, this being necessitated by reason of the fact that the retaining elements 11a and 12a of the retaining clips 9a and 10a are disposed inwardly from the edge of the plate Pa in an amount greater than are the retaining elements 11 and 12 of the retaining clips 9 and 10.

The arrangement shown in Fig. 5 may be mounted upon a card as C in the same manner as the printing member and retaining member shown in Figs. 1 to 4. However, where a printing plate as Pa and a retaining member as Ra are to be employed, the openings corresponding to the openings 7 and 8, through which the clips 9a and 10a are to be passed, will be spaced one from the other in the card in an amount corresponding to the spacing of the clips 9a and 10a from each other.

A further modified form of my invention is shown in Fig. 6, and where elements appearing in Fig. 6 correspond to elements described hereinabove, the reference character that has been applied to such corresponding elements heretofore is applied to the element as it appears in Fig. 6, and in such instance the suffix "b" is added to the reference character.

The printing plate Pb shown in Fig. 6 is like the printing plate P except that the retaining clips 9b and 10b provided thereon are afforded by material that is struck from the main body of the rectangular plate P inwardly of the shorter edges of this plate and the material that is so struck from the body of the plate Pb is formed in the manner described hereinabove with reference to the clips 9 and 10 so as to thereby afford retaining elements 11b and 12b. In this instance, the upstanding portions of the clips 9b and 10b are spaced inwardly from the adjacent shorter edges of the plate.

The retaining member Rb corresponds to the retaining member R, but in this instance the recesses 13b and 14b formed therein extend inwardly from the shorter edges of this rectangular retaining member in an amount greater than the extent of the recesses 13 and 14 into the retaining member R. This arrangement enables the marginal portions at the inner ends of the recesses 13b and 14b to be disposed beneath the retaining elements 11b and 12b when the various members are assembled one on the other in the manner hereinabove described. Moreover, the openings corresponding to the openings 7 and 8 in the card on which the printing plate Pb and the retaining member Rb are to be mounted are spaced one from the other in an amount corresponding to the spacing of the clips 9b and 10b one from the other.

It will be understood that the printing plates and retaining members respectively shown in Figs. 5 and 6 may be utilized in the same manner as that described hereinabove with reference to the card C, the printing member P and the retaining member R.

In the form of my invention illustrated in Figs. 7 to 10, inclusive, elements which correspond to those described hereinabove are designated by the same reference character as that employed hereinabove to designate such elements, except that the suffix "c" is added to such reference characters where they appear in Figs. 7 to 10, inclusive.

Figure 8:
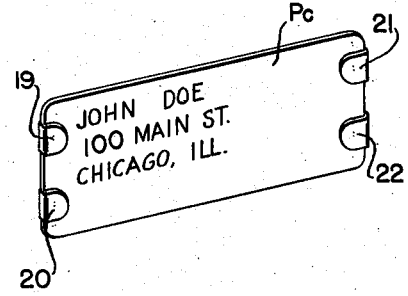
Fig. 8 is a perspective view of the printing plate employed in the embodiment of my invention shown in Fig. 7.
Figure 9:
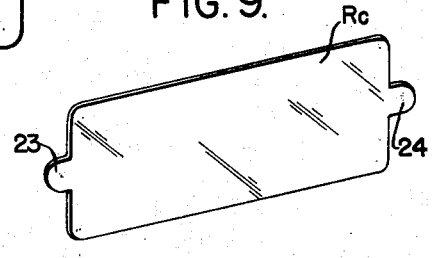
Fig. 9 is a perspective view of the retaining member employed in the embodiment of my invention shown in Fig. 7.
Figure 10:
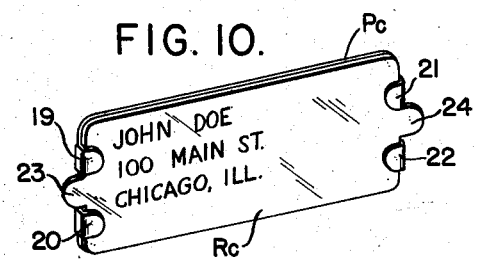
Fig. 10 is a perspective view showing the printing plate of Fig. 8 assembled with the retaining member of Fig. 9.
Figure 11:
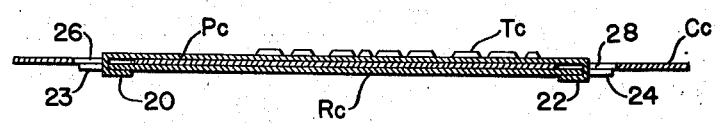
Fig. 11 is a longitudinal sectional view taken substantially along the line 11—11 on Fig. 7.

Referring to Fig. 8, the rectangular printing plate Pc is somewhat similar to the printing plate P, except that one of the shorter marginal edges thereof is equipped with clips 19 and 20, each of which is formed similarly to the formation of the retaining clip 10. These retaining clips 19 and 20 are spaced inwardly from the longer edges of the printing plate Pc and are also spaced one from the other.

Other retaining clips 21 and 22 are provided on the marginal end of the plate Pc opposite that having the clips 19 and 20 formed thereon, and these clips 21 and 22 are each formed similarly to the retaining clip 9. Moreover, the retaining clip 21 is aligned with the retaining clip 19, while the retaining clip 22 is aligned with the retaining clip 20.

The retaining member Rc corresponds to the rectangular retaining member R, except that along one of the shorter edges thereof an outstanding tongue 23 is formed and a similar tongue 24 is formed along the opposite edge thereof. These tongues are medially located along the extent of the edges whereat they are provided.

As best shown in Fig. 7, the card Cc has openings 25 and 26 formed therein which are spaced apart similarly to the spacing apart of the retaining clips 19 and 20. Other openings 27 and 28 are formed in the card Cc and these openings are spaced apart one from the other in the same amount as the spacing of the clips 21 and 22 one from the other. Moreover, the opening 27 is spaced from the opening 25 in an amount corresponding to the spacing of the clip 19 to the clip 21. The opening 26 is spaced from the opening 28 in an amount corresponding to the spacing between the retaining clips 20 and 22. The arrangement is such that when the printing plate Pc is moved toward the card Cc, the clips 19 and 20 will respectively pass through the openings 25 and 26, while the retaining clips 21 and 22 will respectively pass through the openings 27 and 28. Once the inner face of the plate Pc is engaged with the card Cc, then a retaining member Rc is mounted on the face of the card Cc opposite that on which the plate Pc is mounted. The retaining member Rc is flexed so as to enable the marginal portions thereof along the shorter edges thereof and on opposite sides of the tongues 23 and 24 to be respectively disposed beneath the clips 19 and 20, and 21 and 22, whereby tongues 23 and 24 respectively project between the clips 19 and 20, and 21 and 22, respectively, and beyond the shorter edges of the plate Pc. Hence, when the retaining member Rc is disposed flat against the card Cc a printing plate Pc and a retaining member Rc are held against relative movement relative to one another and also relative to the card Cc.

It will be understood that a printing plate Pc and a retaining member Rc and the card Cc are utilized in the same manner as that described hereinabove with reference to the card C, printing member P and the retaining member R.

While I have described the clips as being formed on the printing member, it will be understood that this arrangement might be reversed so that the clips would be formed on the retaining member. In such circumstances it would be necessary that the member effective to make impressions from the type characters on the printing member be confined to the area whereat the type characters are formed so as to thereby avoid making printing impressions from the clips. Moreover, in such an arrangement the printing member would embody sufficient resiliency as to enable it to be flexed when being engaged with or disengaged from the clips afforded on the retaining member.

It will be seen from the foregoing description that I have provided an arrangement which enables the hereinabove set forth and kindred objects of this invention to be realized and, while I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. A printing device comprising an identification part having openings formed therein that are spaced apart a predetermined distance, a substantially rectangular printing member mounted on one side of said identification part, and a retaining member substantially complementary in outline to said printing member and mounted on the other side of said identification part, one of said members having clips formed thereon on the shorter edges thereof that include parts extended in normal relation to such member and which are spaced apart in said predetermined distance and which are extended through the openings in said identification part, said clips having additional parts at the free ends thereof extended inwardly thereof in spaced relation with the member on which the clips are mounted, said additional parts being aligned with said openings and being freely movable therefrom by movement perpendicular to said identification part, the other of said members being flexible and having projections formed thereon in position to extend past the parts of the clips that extend in normal relation to the member on which the clips are formed, said other member also including portions disposed between said identification part and the parts at the free ends of said clips, said clips and said projections and portions on said other member cooperating to interconnect said members to said identification part.

2. A printing device comprising an identification part having openings formed therein and spaced a predetermined distance apart, a substantially rectangular printing member mounted on one side of said identification part, and a retaining member that is substantially complementary in outline to said printing member and which is mounted on the other side of said identification part, one of said members having clips formed thereon at the medial portions of the shorter edges thereof that include parts extended in normal relation to such member and which are spaced apart in substantially said predetermined distance and are extended through the respective openings in said identification part, said clips including additional parts at the free ends thereof extended inwardly of and in spaced relation with the member on which said clips are formed, said additional parts of said clips being aligned with said openings and being freely removable therefrom by movement perpendicular to the said identification part, the other of said members being flexible and having projections formed thereon in position to extend past opposite sides of the parts of clips that extend in normal relation to the member on which the clips are formed, said other member also including portions disposed between said identification part and the parts at the free ends of said clips, said clips and said projections and portions on said other member cooperating to interconnect said members to said identification part.

3. A printing device comprising an identification part having openings formed therein and spaced apart in a predetermined distance, a substantially rectangular printing member mounted on one side of said identification part, and a flexible retaining member that is substantially complementary in outline to said printing member and which is mounted on the other side of said identification part, said printing member having clips formed thereon at the medial portions of the shorter edges thereof that include parts extended in normal relation to such member and which are spaced apart in substantially said predetermined distance and are extended through the openings in said identification part, said clips including parts at the free ends thereof extended inwardly of and in spaced relation with said printing member and said last mentioned parts being aligned with said openings when the clips of printing member have been extended through said openings, said retaining member having projections formed thereon in position to extend past the opposite side of the respective parts of clips that extend in normal relation to the printing member, said retaining member also including portions disposed between said identification part and the parts at the free ends of said clips, said clips and said projections and portions on said retaining member cooperating to interconnect said members to said identification part.

4. A printing device comprising an identification part having openings formed therein and spaced apart in a predetermined distance, a substantially rectangular printing member mounted on one side of said identification part, and a flexible retaining member that is substantially complementary in outline to said printing member and which is mounted on the other side of said identification part, said printing member having clips thereon that are afforded by extensions of said member disposed substantially medially of the shorter edges thereof and which comprise parts extended in normal relation to such member and which are spaced apart in substantially said predetermined distance and are freely extended through the respective openings in said identification part, said clips including parts at the free ends thereof extended inwardly of and in spaced relation with said printing member, said retaining member having projections formed thereon in position to extend past the parts of clips that extend in normal relation to the printing member, said retaining member also including portions disposed between said identification part and the parts at the free ends of said clips, said clips and said projections and portions on said retaining member cooperating to interconnect said members to said identification part.

5. A printing device comprising an identification part having openings formed therein spaced apart in a predetermined distance, a substantially rectangular printing member mounted on one side of said identification part, and a flexible retaining member that is substantially complementary in outline to said printing member and which is mounted on the other side of said identification part, said printing member having clips thereon that are afforded by portions struck from said printing member inwardly and substantially medially of the shorter edges thereof and which comprise parts extended in normal relation to such member and which are extended through the openings in said identification part, the respective clips including overhanging parts at the free ends thereof extended toward each other inwardly of and in spaced relation with said printing member, said overhanging parts being spaced from each other in said predetermined distance so that said clips may pass freely and respectively through said openings, said retaining member having projections formed thereon in position to extend past the parts of clips that extend in normal relation to the printing member, said retaining member also including portions disposed between said identification part and said overhanging parts of said clips, said clips and said projections and portions on said retaining member cooperating to interconnect said members to said identification part.

6. As an article of commerce, an embossable printing plate and a retaining member adapted for mounting on an identification part that has a pair of openings formed therein in a predetermined spaced relation, said plate and retaining member being adapted to be disposed in face-to-face relation and being of substantially rectangular and complementary in outline, one of said members having clips formed at substantially the medial parts of the shorter edges thereof that include parts extended in normal relation to said member and other parts at the free ends thereof that are extended inwardly of said member in spaced relation therewith, the other of said members being flexible and including portions adapted to be disposed beneath the inwardly extending parts of said clips and having projections thereon that project past the parts of said clips that are extended in normal relation with the member on which such clips are formed whereby said members may be interconnected one with the other.

7. As an article of commerce, an embossable printing plate and a flexible retaining member adapted for mounting on an identification part that has a pair of openings formed therein in a predetermined spaced relation, said plate and retaining member being adapted to be disposed in face-to-face relation and being of substantially rectangular and complementary in outline, said printing member having clips formed at substantially the medial parts of the shorter edges thereof that include parts extended in normal relation to said member and other parts at the free ends thereof that are extended inwardly of said member in spaced relation therewith, said clips being spaced apart in said predetermined relation so that they may be passed freely and respectively through the pair of openings in said identification part, said retaining member including portions adapted to be disposed beneath the inwardly extending parts of said clips and having projections thereon that project past the opposite sides of the respective parts of said clips that are extended in normal relation with the printing member whereby said members may be interconnected one with the other.

8. As an article of commerce, an embossable printing plate and a flexible retaining member adapted for mounting on an identification part that has a pair of openings formed therein in a predetermined spaced relation, said plate and retaining member being adapted to be disposed in face-to-face relation and being of substantially rectangular and complementary in outline, said printing member having clips thereon that are afforded by extensions of said member disposed substantially medially of the shorter edges thereof and which comprise parts extended in normal relation to said member and other parts at the free ends thereof that are extended inwardly of said member in spaced relation therewith, said clips being spaced apart in said predetermined relation so that they may be passed freely and respectively through the pair of openings in said identification part, said retaining member including portions adapted to be disposed beneath the inwardly extending parts of said clips and having projections thereon that project past the parts of said clips that are extending in normal relation with the printing member whereby said members may be interconnected one with the other.

9. As an article of commerce, an embossable printing plate and a flexible retaining member adapted for mounting on an identification part that has a pair of openings formed therein in a predetermined spaced relation, said plate and retaining member being adapted to be disposed in face-to-face relation and being of substantially rectangular and complementary in outline, said printing member having clips thereon that are afforded by portions struck from said printing member inwardly and substantially medially of the shorter edges thereof and which comprise parts extended in normal relation to said member and other parts at the free ends thereof that are extended inwardly of said member in spaced relation therewith, said clips being spaced apart in said predetermined relation so that they may be passed freely and respectively through the pair of openings in said identification part, said retaining member including portions adapted to be disposed beneath the inwardly extending parts of said clips and having projections thereon that project past the parts of said clips that are extended in normal relation with the printing member whereby said members may be interconnected one with the other.

10. A printing device comprising an identification part having openings formed therein that are spaced apart a predetermined distance, a substantially rectangular printing member mounted on one side of said identification part, and a flexible retaining member substantially complementary in outline to said printing member and mounted on the other side of said identification part, said printing member having a pair of clips formed on each of the shorter edges thereof that are spaced apart one from the other and which include parts extended in normal relation to such member, the extended parts at one end of said printing member being spaced in said predetermined distance from the extended parts at the other end thereof, said identification part having an opening formed therein for each of said clips and said extended parts being extended through the openings in said identification part, said clips having additional parts at the free ends thereof extended inwardly thereof in spaced relation with the member on which the clips are mounted, said additional parts being aligned with said openings and being freely movable therefrom by movement perpendicular to said identification part, the retaining member having a projection formed on each end thereof in position to extend between and past the parts of the clips at each end of the printing member that extend in normal relation to said member, said retaining member also including portions disposed between said identification part and the parts at the free ends of said clips, said clips and said projections and portions on said retaining member cooperating to interconnect said members to said identification part.

11. A printing device comprising an identification part having openings formed therein that are spaced apart a predetermined distance, a substantially rectangular printing member mounted on one side of said identification part, and a flexible retaining member substantially complementary in outline to said printing member and mounted on the other side of said identification part, said printing member having a pair of clips formed on each of the shorter edges thereof that are spaced apart one from the other and which include parts extended in normal relation to such member, the extended parts at one end of said printing member being spaced in said predetermined distance from the extended parts at the other end thereof, said identification part having an opening formed therein for each of said clips and said extended parts being extended through the openings in said identification part, said clips having additional parts at the free ends thereof extended inwardly thereof in spaced relation with the member on which the clips are mounted, said additional parts being aligned with said openings and being freely movabel therefrom by movement perpendicular to said identification part, the retaining member having a projection formed on each end thereof in position to extend between and past the parts of the clips at each end of the printing member that extend in normal relationship to said member, the retaining member also including portions disposed between said identification member and the parts of the clips at the free ends of said clips, said clips and said portions cooperating to interconnect said members to said identification part.

12. As an article of commerce, an embossable printing plate and a retaining member adapted for mounting on an identification part that has openings formed therein that are spaced apart a predetermined distance, said plate and retaining member being adapted to be disposed in face-to-face relation and being substantially rectangular and complementary in outline, one of said members having clips formed thereon on the shorter edges thereof that include parts extended in normal relation to such member and which are spaced apart in said predetermined distance and which may be extended through the openings in the identification part, said clips having additional parts at the free ends thereof extended inwardly thereof in spaced relation with the member on which the clips are mounted, said additional parts being adapted to be aligned with the openings to be freely movable thereinto and therefrom by movement perpendicular to the identification part, the other of said members being flexible and including portions adapted to be disposed beneath the inwardly extending parts of the clips and having projections thereon that project past the parts of the clips that are extended in normal relation with the member on which such clips are formed whereby said members may be interconnected one with the other.

13. As an article of commerce, an embossable printing plate and a retaining member adapted for mounting on an identification part that has sets of openings formed therein and wherein the sets of openings are spaced apart in a predetermined distance, said plate and retaining member being adapted to be disposed in face-to-face relation and being substantially rectangular and complementary in outline, one of said members having sets of clips formed on the respective shorter edges thereof that include parts extended in normal relation to said member and other parts at the free ends thereof that are extended inwardly of said member in spaced relation therewith, the sets of clips being spaced apart said predetermined distance and the clips in each set being spaced from each other and inwardly of the longer edges of the member on which they are formed, the other of said members being flexible and including portions adapted to be disposed beneath the inwardly extending parts of said clips and having projections thereon that project past the parts of said clips that are extended in normal relation with the member on which such clips are formed whereby said members may be interconnected one with the other.

14. As an article of commerce, an embossable printing plate and a retaining member adapted for mounting on an identification part that has sets of openings formed therein and wherein the sets of openings are spaced apart in a predetermined distance, said plate and retaining member being adapted to be disposed in face-to-face relation and being substantially rectangular and complementary in outline, said printing member having sets of clips formed on the respective shorter edges thereof that include parts extended in normal relation to said printing member and other parts at the free ends thereof that are extended inwardly of said printing member in spaced relation therewith, the sets of clips being spaced apart said predetermined distance and the clips of each set being spaced from each other and inwardly of the longer edges of the member on which they are formed, and said retaining member being flexible and including portions that are adapted to be disposed beneath the inwardly extending parts of the clips and having projections thereon that project past the parts of said clips that are extended in normal relation with the printing member whereby said members may be interconnected one with the other.

FRANKLIN E. CURTIS.

REFERENCES CITED

The following references are of record in the file of this patent:

UNITED STATES PATENTS

| Number | Name | Date |
|---|---|---|
| 1,818,830 | Van Dusen | Aug. 11, 1931 |
| 1,899,072 | Anthony | Feb. 28, 1933 |
| 2,305,195 | Richter | Dec. 15, 1942 |
| 2,518,535 | Farrington | Aug. 15, 1950 |